(12) United States Patent
Gifford et al.

(10) Patent No.: US 11,415,816 B2
(45) Date of Patent: Aug. 16, 2022

(54) CONTACT LENS

(71) Applicant: Capricornia Contact Lens Pty Ltd, Slacks Creek (AU)

(72) Inventors: Paul Gifford, Brisbane (AU); Jodie Davenport, Slacks Creek (AU)

(73) Assignee: Capricornia Contact Lens Pty Ltd

( * ) Notice: Subject to any disclaimer, the term of this patent is extended or adjusted under 35 U.S.C. 154(b) by 596 days.

(21) Appl. No.: 16/471,138

(22) PCT Filed: Dec. 22, 2017

(86) PCT No.: PCT/AU2017/051461
§ 371 (c)(1),
(2) Date: Jun. 19, 2019

(87) PCT Pub. No.: WO2018/112558
PCT Pub. Date: Jun. 28, 2018

(65) Prior Publication Data
US 2020/0041816 A1    Feb. 6, 2020

(30) Foreign Application Priority Data
Dec. 23, 2016  (AU) .................................. 2016905375

(51) Int. Cl.
*G02C 7/04* (2006.01)
*G02B 1/04* (2006.01)

(52) U.S. Cl.
CPC ............. *G02C 7/047* (2013.01); *G02B 1/043* (2013.01); *G02C 7/049* (2013.01); *G02C 7/041* (2013.01)

(58) Field of Classification Search
CPC ......... G02B 1/043; G02C 7/049; G02C 7/047
(Continued)

(56) References Cited

U.S. PATENT DOCUMENTS 5,963,297 A * 10/1999 Reim ..................... G02C 7/047
                                                          351/159.23
6,325,509 B1 * 12/2001 Hodur ..................... G02C 7/04
                                                          351/159.14
(Continued)

FOREIGN PATENT DOCUMENTS

CN         1200698 C      5/2005
CN         100507639 C    7/2009
(Continued)

OTHER PUBLICATIONS

Chinese Search Report for Application No. 2017800848597 dated Oct. 10, 2020, 2 pages.
(Continued)

*Primary Examiner* — James R Greece
(74) *Attorney, Agent, or Firm* — Lerner, David, Littenberg, Krumholz & Mentlik, LLP

(57) ABSTRACT

A contact lens (10) comprising an anterior surface (14), a posterior surface (16), a central zone (12) with a first radius of curvature, a first peripheral zone (10) extending radially from the central optical zone, the first peripheral zone (1) having an inner margin (1*a*) having a radius of curvature that is substantially identical to the first radius of curvature of the central zone (12) and an outer margin (1*b*), wherein the first peripheral zone (1) is spherical at the inner margin (1*a*) and is aspheric at the outer margin (1*b*) and there is a change in a sphericity across the first peripheral zone (1) from the inner margin (1*a*) to the outer margin (1*b*) and the contact lens (10) comprises at least one further peripheral zone (2,3,4,5) having a radius of curvature that is less the first radius of curvature.

16 Claims, 11 Drawing Sheets

(58) Field of Classification Search
USPC .................................................. 351/159.02
See application file for complete search history.

(56) References Cited

U.S. PATENT DOCUMENTS

| | | | | |
|---|---|---|---|---|
| 6,537,545 | B1* | 3/2003 | Karageozian | G02C 7/047 |
| | | | | 424/94.4 |
| 6,582,077 | B1* | 6/2003 | Tabb | G02C 7/047 |
| | | | | 351/159.74 |
| 6,997,553 | B2* | 2/2006 | Tung | G02C 7/041 |
| | | | | 351/159.1 |
| 9,743,832 | B2* | 8/2017 | de Paz Sicam | A61B 3/107 |
| 2003/0175259 | A1 | 9/2003 | Karageozian et al. | |
| 2004/0257524 | A1* | 12/2004 | Tung | A61F 9/0017 |
| | | | | 351/159.1 |
| 2006/0132707 | A1* | 6/2006 | Tung | A61F 9/0017 |
| | | | | 351/159.23 |
| 2006/0152673 | A1* | 7/2006 | Cotie | G02C 7/047 |
| | | | | 351/159.34 |
| 2013/0339043 | A1* | 12/2013 | Bakar | G16H 20/10 |
| | | | | 705/2 |

FOREIGN PATENT DOCUMENTS

| | | | |
|---|---|---|---|
| CN | 203745739 U | 7/2014 | |
| CN | 105974605 A | 9/2016 | |
| CN | 106291977 A | 1/2017 | |
| EP | 0742462 A2 | 11/1996 | |
| GB | 2327283 A | 1/1999 | |
| JP | 2006043150 A * | 2/2006 | ............. G02C 7/047 |
| WO | 9945869 A1 | 9/1999 | |
| WO | 2009020963 A1 | 2/2009 | |
| WO | WO-2009020963 A1 * | 2/2009 | ............. G02C 7/04 |
| WO | 2009149116 A2 | 12/2009 | |
| WO | 2010099102 A1 | 9/2010 | |

OTHER PUBLICATIONS

International Search Report and Written Opinion from PCT/AU2017/051461, dated Apr. 17, 2018, 17 pages.

Extended European Search Report including Written Opinion for Application No. EP17883129.3, dated Jul. 20, 2020, pp. 1-11.

* cited by examiner

CONTACT LENS

CROSS-REFERENCE TO RELATED APPLICATIONS

This application is a national phase entry under 35 U.S.C. § 371 of International Application No. PCT/AU2017/051461, filed Dec. 22, 2017, published in English, which claims priority from Australian Patent Application No. 2016905375, filed Dec. 23, 2016, all of which are incorporated herein by reference.

FIELD

This disclosure relates to a contact lens and a method of manufacturing a contact lens. The disclosure also relates to a set of contact lenses and methods and systems relating to treating refractive error in a patient.

This disclosure relates particularly but not exclusively to orthokeratology.

It will therefore be convenient to hereinafter describe the disclosure with reference to this example application. However at the same time it must be recognized that the disclosure is capable of broader application. For example the disclosure could also be used for contact lenses that provide a refractive correction by means of an anterior optic design.

DEFINITION

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

BACKGROUND

Refractive error affects a large percentage of the human population and presents as blurred vision. Refractive error is grouped under categories, myopia, hypermetropia (hyperopia), astigmatism and presbyopia.

Myopia, or short sightedness results in the blur of distant objects. Hyperopia, or long sightedness results in the blur of close objects and results in excessive eye strain. Astigmatism descries orientation blur that is perceived at all distances, a typical presentation being that objects in the vertical meridian are focused at a different plane to objects in the horizontal meridian. These refractive errors occur due to a mismatch between the distance from the front of the cornea, the clear window at the front of the eye, to the retina at the back of the eye and the combined focusing power of the cornea and the lens.

Presbyopia describes loss of effectiveness of the lens to focus and is generally age related.

Each of these refractive errors can be corrected with eyeglasses and contact lenses. Refractive surgery has gained popularity in offering a more permanent solution and the inconvenience of wearing glasses or contacts. Refractive surgery may alter the curvature of the cornea, replace the lens within the eye or add an extra lens. However, surgery is not without risk and many patients are reluctant to undergo such surgery.

A still further treatment method is to use contact lenses to purposefully mould the front surface of the cornea. This is known as orthokeratology (commonly abbreviated to ortho-K) or Corneal Refractive therapy (commonly abbreviated to CRT).

Orthokeratology lenses are generally worn overnight and removed upon waking. The orthokeratology lenses have a posterior surface that is configured to gradually mould the front surface of the cornea whilst the lenses are being worn overnight. This alters the shape of the cornea to correct the refractive error.

This physical change is only made to the corneal epithelium which is a highly fluid and active structure. Following removal of the lens, the cornea gradually resumes its original shape over the course of the day. The corrective effect lasts for the day and the patient must wear the orthokeratology lens every night. If wear of the lens is discontinued, the cornea will eventually revert to the original pre-treatment shape. This normally occurs over about one week. Orthokeratology thus provides patients with the advantage of not having to wear glasses or contact lenses during the day, avoids the invasiveness of surgery and is reversible.

Orthokeratology lenses are used to correct myopia and astigmatism and to a lesser extent hyperopia.

Recent research has shown that orthokeratology to be effective at slowing progression of myopia development in children and young adults, and more effective at slowing progression of myopia compared to other refractive correction options. A major reason for the success of orthokeratology in slowing progression of myopia is the unique change to cornea shape profile that that is possible with a correctly fitted lens.

Conventional orthokeratology and vision correction lenses having a central optic zone and one or more peripheral zones. The curvature of the respective zones is measured in terms of the millimetres of radius of curvature. When the radius is decreased, the curve is said to be steeper and when the radius is increased, the curve is said to be made flatter. In the art of contact lenses the curve of the central zone is commonly referred to as the base curve.

Another important variable of a contact lens is the sagittal height that is the distance between a flat surface and the posterior of the central portion of the lens.

A further variable of a lens is total diameter and the diameter of the central optic zone.

Most orthokeratology lenses are designed so that the first peripheral zone is steeper than the base curve. The general understanding in the art is that the steeper secondary curve provides space for the cornea to move as the central part of the cornea is flattened by the central curve, to help lens centration, thereby reducing astigmatism and to provide a reservoir for tear exchange. Lenses of this type are known in the art as reverse zone or reverse curvature lenses. The secondary curve is known as the reverse curve.

Some patients experience corneal abrasion at the transition between the central curve and the reverse curve and are unable to be treated by orthokeratology.

Conventional reverse curve lenses generally have one or two further peripheral zones or curves. The further zone or zones are concerned with fitting of the contact lens and serve no purpose in moulding the cornea other than to assist in lens centration. In a four zone contact lens, the curve intermediate to the reverse curve and the outer peripheral curve is referred to as an alignment curve or zone. The alignment zone fits over the peripheral cornea and assists with lens centration and movement.

The base curve and reverse curve together is commonly known as the treatment zone. With conventional orthokeratology contact lenses, control of the treatment zone is done by altering the radius of curvature of the central zone. If the radius of curvature is decreased and the diameter is kept constant, the sagittal height of the central zone is increased and the lens is steeper. Conversely, increasing the radius of curvature with a constant diameter decreases the sagittal height and makes the central zone flatter. This provides only rudimentary control of the treatment profile and the shape of the profile cannot predictably be modified.

SUMMARY

In one aspect, the present disclosure relates to an alternative lens that may provide a smoother transition between the central optic zone and the first peripheral zone.

In another aspect there is provided a lens that may more accurately control the profile of curvature within the posterior optic zone to give more predictable control over the lens induced corneal shape profile.

The present disclosure also relates to a method for controlling the treatment profile of an orthokeratology lens. The alternate method and lens may also be suitable for application in contact lenses for vision correction.

The present disclosure also relates to sets of stock lenses that may simplify the orthokeratology fitting process.

Further disclosed are methods of treatment of refractive errors in a patient.

According to a first aspect of the present disclosure, there is provided a contact lens comprising an anterior surface, a posterior surface; and a central optic zone with a first radius of curvature;

a first peripheral zone extending radially from the central optic zone, the first peripheral zone having an inner margin having a radius of curvature that is substantially the same as the first radius of curvature of the central optic zone and an outer margin, wherein the first peripheral zone is spherical at the inner margin and is aspheric at the outer margin and there is a change in asphericity across the first peripheral zone from the inner margin to the outer margin and the contact lens comprises at least one further peripheral zone having a radius of curvature that is less than the first radius of curvature.

For an orthokeratology contact lens, the first radius of curvature of the central optic zone is suitably calculated to differ from a patient's corneal radius of curvature by the amount of refractive change required. Suitably the radius of curvature may vary between about 4 mm to about 12 mm, suitably between about 7 mm and about 9 mm.

Radius of curvature can be converted from mm to equivalent refractive power using a refractive index of 1.3375, which is the average value of refractive index for the human cornea. To correct myopia, the radius of curvature for the central optic zone is flatter than that of the cornea.

Contrary to traditional reverse curve orthokeratology lenses the first peripheral zone has an inner margin that is spherical and has substantially the same radius of curvature as the central zone and is aspheric at the outer margin.

The central zone may be spherical or toric.

In another aspect, the central optic zone may be aspherical in which case, the radius of curvature varies across the zone. The radius of curvature may be described as an ellipse comprising apical curvature and eccentricity.

Asphericity is a term given to define the rate of flattening of an elliptical surface. An asphericity value of 0 is equivalent to a spherical surface; a negative value of asphericity indicates a flattening, also known as a prolate, elliptical surface and a positive value of asphericity indicates a steepening, also known as an oblate, elliptical surface.

The diameter of the central optic zone may be between about 2 mm to about 5 mm. Typical diameters may be between about 3 mm to about 4.5 mm, suitably about 4 mm.

By the first peripheral zone having a radius of curvature that is substantially the same as the first radius of curvature is meant that some minor differences in curvature may be tolerated. For example the variance may be +/−1.0 to 0.1% of the first radius of curvature of the outer margin central optic zone.

The first peripheral zone changes from spherical to aspherical across the width of the first peripheral zone from the inner margin through to the outer margin. Suitably the asphericity at the outer margin is between about −3 to about +3, suitably between about −2 to about +2, suitably between about −1 to about +1.

The present inventors have surprisingly and unexpectedly discovered that such a design for the first peripheral zone has unique and unexpected advantages over conventional lenses. By virtue of the first peripheral zone being spherical at the inner margin and being of substantially the same radius of curvature as the central optic zone, tangent continuity is created that creates a smooth transition from the central zone into the first peripheral zone.

In orthokeratology lenses, this provides a smooth surface for the area of the lens that is in compressive contact with the cornea and can reduce the risk of corneal abrasion. It may also mean that some patient's that were previously unable to use contact lenses because of corneal abrasion and/or difficulties with fitment, may now be able to enjoy the advantages of contact lens treatment.

For vision correcting contact lenses, this smooth transition may provide a smoother and more comfortable fit.

Previous attempts to provide for tangent continuity provided multiple zones formed in a stepwise manner. However, as the radius of curvature and/or asphericity for each zone is defined independently, the curvature across the full width of the zone cannot provide a continuous transition of the lenses as described herein.

Furthermore, this relationship between the central zone and the first peripheral zone allows the central optic diameter to be reduced whilst remaining smooth with a first peripheral zone with an increased width. This makes it possible to target a smaller area of corneal compression.

Recent research is indicating that smaller treatment zone sizes might be advantageous in improving the myopia controlling effect that has been demonstrated from orthokeratology lens wear. With myopia, the light focused on the peripheral retina is focused behind the retina. This mismatch has been thought to drive the growth of the eyeball to accommodate for the peripheral defocus. Consequently the eye becomes more short-sighted.

Orthokeratology creates central corneal flattening surrounded by an annulus of steepening, and it is this profile that is believed to slow progression of myopia by causing peripheral light rays, that are focused through the steepened annulus, to focus anterior to central rays that pass through the central flattened part of the cornea. Animal research has shown that this kind of refraction profile causes peripheral light rays to fall in front of the retina, while central light rays are focussed onto the retina to correct vision. By reducing the treatment zone of the flattened area it is thought that a better myopia controlling effect may be provided.

Through utilising the aspheric graduation of the first peripheral zone, it is also possible to compress the central cornea without altering its curvature. In this way an emmetropic eye (eye that doesn't suffer vision problems) can have the cornea altered to provide no change centrally surrounded by a peripheral annulus of steepening that will cause off axis peripheral light rays to focus anteriorly to the retina. This can offset the drive of growth of the eye to accommodate peripheral focus. This can offer benefit in patients with a demonstrated likelihood of developing myopia as a way to prevent onset of myopia.

According to another aspect of the disclosure, there is provided a method for preventing or delaying the onset of myopia in a patient at risk of developing myopia as a result of peripheral refractive error, the method comprising providing a contact lens as disclosed in the first aspect, wherein the central optic zone and the first peripheral zone have a profile that when worn by the patient, moulds the cornea to provide an annulus of steepening in the cornea that surrounds the central region of the cornea such that the peripheral refractive error is provided with hyperopic correction without changing refraction in the central cornea, and causing the patient to wear the contact lens.

The change from zero asphericity at the inner margin of the first peripheral zone to the required amount of asphericity at the outer margin may suitably be calculated using a cubic function where the asphericity value at any point is defined as:

Required outer edge asphericity*root of(difference between the inner margin position and measurement point).

Another important parameter of a contact lens is the sagittal height of the central optic zone so as to provide a predetermined lens clearance value between the surface of the central cornea and the central optic zone.

In this aspect, this change in height across the central optic zone and first peripheral zone may be calculated in the following steps:
(a) obtaining a model of a human cornea that provides a value of a central cornea radius and a sagittal height of the cornea;
(b) setting the diameter of the central optic zone of the contact lens;
(c) calculating the radius of curvature of the central optic zone of the contact lens based upon the value of the central corneal radius of curvature;
(d) calculating the sagittal height of the central optic zone from the diameter and calculated radius of curvature;
(e) setting the radius of curvature of the inner margin of the first peripheral zone to be substantially the same as that of the central zone;
(f) setting the width of the first peripheral zone;
(g) calculating from the cornea model the sagittal height across the chord defined by the outer margin of the first peripheral zone; and
(h) calculating the change in height across the first peripheral zone by subtracting the sagittal height of the central zone from the sagittal height calculated in step (g) and adding a predetermined lens clearance value.

The aspherical value for the first peripheral zone may then be calculated to provide the change in height across the first peripheral zone.

The values for the cornea may be obtained by known methods as used in the art such as by using a keratometer or computerised corneal topography.

For an orthokeratology contact lens, the radius of curvature of the central optic zone is calculated such that the radius of the central zone is flatter than the central corneal radius by the amount of desired refractive change.

As discussed above, for a spherical central optic zone, the radius of curvature is constant. For an aspheric central optic zone, the change of radius of curvature across the central optic zone is calculated such that the central optic zone is flatter than the central corneal radius across the central optic zone. Thus the term "radius of curvature" in the method can also be described as an ellipse comprising apical curvature and eccentricity.

Determination of the refractive change required by a patient can also be carried out using methods known in the optometry arts.

According to another aspect of the disclosure, there is provided a method of manufacturing an orthokeratology contact lens to correct a refractive error of a patient comprising the steps of:
(a) obtaining a cornea model that includes a value of a central cornea radius and a sagittal height of the patient's cornea;
(b) determining the amount of refractive change required to correct the refractive error;
(c) setting the diameter of a central optic zone of an orthokeratology contact lens for use in the patient's treatment;
(d) calculating the radius of curvature of the central optic zone of the contact lens based upon the value of the central corneal radius wherein the radius of curvature of the central optic zone is flatter than the central corneal radius of the patient by the amount of refractive change;
(e) calculating the sagittal height of the central optic zone from the diameter and calculated radius of curvature;
(f) setting the radius of curvature of a first peripheral zone of the contact lens to be substantially the same as that of the radius of curvature of the outer margin of the central optic zone;
(g) setting the width of the first peripheral zone;
(h) calculating from the cornea model the sagittal height across the chord defined by the outer margin of the first peripheral zone;
(i) calculating the change in height across the first peripheral zone by subtracting the sagittal height of the central optic zone from the sagittal height calculated in step (i) and adding a predetermined lens clearance value;
(j) calculating an asphericity value for the first peripheral zone to provide the change in sagittal height across the first peripheral zone; and
(k) manufacturing a contact lens in accordance with the above values such that the first peripheral zone extends radially from the central optic zone, the first peripheral zone has an inner spherical margin having a radius of curvature that is substantially the same to the first radius of curvature of the central optical zone and an outer margin that has an asphericity value as calculated in step (j) and at least one further peripheral zone having a radius of curvature that is less the first radius of curvature.

The contact lenses are suitably made from a rigid gas permeable material and shaped with a lathe cutting process in which blanks are shaped with a computer-controlled cutting tool as is known in the art of contact lens manufacture.

According to another aspect of the disclosure, there is provided a method of treating a patient for a refractive error comprising the steps of:
(a) obtaining a model of a cornea of a patient that includes a value of a central cornea radius and a sagittal height of the patient's cornea;

(b) determining the amount of refractive change required to correct the refractive error;
(c) setting the diameter of a central optic zone of an orthokeratology contact lens for use in the patient's treatment;
(d) calculating the radius of curvature of the central optic zone of the contact lens based upon the value of the central corneal radius wherein the radius of curvature of the central optic zone is flatter than the central corneal radius of the patient by the amount of refractive change;
(e) calculating the sagittal height of the central zone from the diameter and calculated radius of curvature;
(f) setting the radius of curvature of a first peripheral zone of the contact lens to be substantially the same as that of the central zone;
(g) setting the width of the first peripheral zone;
(h) calculating from the cornea model the sagittal height across the chord defined by the outer margin of the first peripheral zone;
(i) calculating the change in height across the first peripheral zone by subtracting the sagittal height of the central optic zone from the sagittal height calculated in step (i) and adding a predetermined lens clearance value;
(j) calculating an asphericity value for the first peripheral zone to provide the change in sagittal height across the first peripheral zone;
(k) manufacturing a contact lens in accordance with the above values such that the first peripheral zone extends radially from the central optic zone, the first peripheral zone has an inner spherical margin having a radius of curvature that is substantially to the same as the radius of curvature of the central optical zone and an outer margin of the first peripheral zone has an asphericity value as calculated in step (j) and at least one further peripheral zone having a radius of curvature that is less the radius of curvature of the central optic zone; and
(l) causing the patient to wear the contact lens for a period of time sufficient to change the shape of the patient's cornea.

The contact lens has at least one further peripheral zone. Suitably the contact lens has a second peripheral zone that assists with alignment of the lens on the cornea.

Suitably, the second peripheral zone is spherical and has a steeper radius of curvature than that of the central optic zone.

In one aspect of the disclosure, the sagittal height of the second peripheral zone is calculated from a cornea model. The sagittal height of the second peripheral zone is suitably the same or substantially the same as the cornea sagittal height that is coincident with the second peripheral zone.

Suitably the second spherical zone has a width of between about 0.1 mm and about 2.0 mm.

In one aspect, the contact lens has a third peripheral zone that further assists in alignment and has a steeper radius of curvature than the central optic and first peripheral zones.

Suitably the third spherical zone has a width of between about 0.1 mm and about 2.0 mm.

In a preferred aspect, the contact lens has a fourth peripheral zone that is known as a "landing zone" that brings the contact lens surface into tangent continuity with the underlying cornea.

As discussed above, it is considered desirable to reduce the central optical treatment zone. One method to do this is to increase the asphericity of the central optic zone and/or the first peripheral zone while steepening the radius of curvature of the second peripheral zone and correspondingly flattening the radius of curvature of the third peripheral zone to maintain the same sagittal height at the outer margin of the third peripheral zone as the pre-altered lens design. Such an optical profile may create a potentially more beneficial myopia controlling effect.

Suitably, the fourth peripheral zone has a flat surface that forms a tangent to the central axis of the lens.

Suitably, a mathematical slope of the cornea model at a predetermined chord is calculated. The slope of the fourth peripheral zone is suitably given the same value as the corneal slope. The slope is calculated back to the start of the fourth peripheral zone (or outer margin of the third peripheral zone). The difference in height of the lens at the inner margin of the fourth peripheral zone and the outer margin of the fourth peripheral zone is then calculated.

The radius of curvature of the third peripheral zone may now be calculated. The sagittal height of the lens at the start of the third peripheral zone is calculated by combining the already known sagittal heights of the already known central zone, first peripheral zone and second peripheral zone.

The sagittal height change required across the third peripheral zone is the sagittal height of the cornea model at a chord coincident with the outer margin of the third peripheral zone, less sagittal height of the lens at the start of the third peripheral zone, plus the difference in height to the corneal model calculated above. Once the sagittal height change required across the third peripheral zone is known, the radius required to provide this measurement is a simple mathematical process.

At this stage the parameters of the central optic zone, first peripheral zone, second peripheral zone, third peripheral zone and fourth peripheral zones have all been calculated. Joined together these form the bulk of the lens. The lens will now rest on the cornea model to align with the cornea model at the apex and align with the cornea model within the fourth peripheral zone.

In a further aspect, the contact lens further includes a fifth peripheral zone that is spherical, has a reverse profile to the third and fourth zones, and has tangent continuity with the outer margin of the fourth zone. This provides what is known in the art as an "edge lift" that prevents the edge of the lens from compressing into the eye.

The radius of curvature of the fifth and final peripheral zone is defined according to the clearance between the edge of the lens and the corneal model that is required. A smaller radius creates greater edge lift and increasing the radius reduces edge lift.

The cornea model used in the method of treatment as disclosed above may be that of a single patient or may be an average corneal topography profile distribution extrapolated from a population.

The average corneal topography distribution profile may be in the form of subsets that are grouped according to a predetermined range of one or more corneal parameters. Such parameters may include one or more of sagittal height, corneal radius of curvature or a mathematical slope at a predetermined chord.

Within a parameter range, an average of the other parameters may be obtained. Suitably, a subset of sagittal height within a sagittal height range is obtained and an average of the radius of curvature within that subset and mathematical slope at a chord is obtained.

This data provides representative corneal data of the population. An advantage of these subgroups is that measurement of only one parameter can be extrapolated to the other parameters. This significantly reduces the complexity of measurements provided. Corneal parameters can be extrapolated from a single keratometry measurement of the radius of curvature of the center of the cornea.

Calculations may then be carried out on each subset using the average values obtained so as to provide parameters for a set of stock lenses As discussed above, when designing lenses for orthokeratometry, the radius of curvature of the central optic zone of the lens is calculated to be flatter than the radius of the cornea by the refractive change required.

When designing lenses for vision correction, the radius of curvature is calculated to match that of the cornea.

A set of stock lenses may therefore be provided to treat patients having different ranges of radius of curvature of the cornea and the same refractive power correction. This means that a stock lens may be selected based upon a single keratometry value and the patient's refractive correction prescription.

According to a further aspect of the disclosure, there is provided a stock set of contact lenses for refractive power correction in a patient, wherein each contact lens in said set has a central optical zone with a radius of curvature that is different from the radius of curvature of the other contact lenses in the set and each contact lens in the set targets the same refractive power correction.

In a preferred aspect, the contact lenses in the set are contact lenses as disclosed in the first aspect of the disclosure.

In a preferred aspect of the disclosure, the set of stock contact lenses are orthokeratology contact lenses. In this aspect, each stock contact lens may have an identifier equal to the radius of curvature of a cornea less the refractive power being targeted.

One or more further sets of stock contact lenses may be provided for different refractive powers being targeted. This will require a new set of calculations for each refractive change. This will result in a change in the sagittal height of the central zone and first peripheral zones of the lens.

According to a still further aspect, there is disclosed a plurality of sets of stock contact lenses for refractive power correction, wherein each contact lens in each set has a central optic zone with a radius of curvature that is different from the radius of curvature of the other contact lenses in the set and each contact lens within a set targets the same refractive power correction, wherein each set of stock contact lenses targets a different refractive power correction.

In a preferred aspect of the sets of contact lenses as disclosed herein, the sagittal height of a lens from the outer margin of the first peripheral zone to the outer margin of each contact lens in the set does not change and is effectively independent of the degree of refractive power being targeted.

Assessment of a good fitting orthokeratology lens is currently established using existing lens designs by assessing the change that the lens has made to corneal shape during overnight wear, and altering lens parameters to compensate any shortfall identified from the corneal topography analysis.

There are significant advantages with an orthokeratology contact lens in which optical lens parameters to change the refractive correction required can be made whilst maintaining consistent sagittal height measured at the outer limit of the first peripheral zone independent to the degree of refractive power being targeted. This allows greater prediction of change required at lens fit follow up visits.

The disclosed contact lenses improve the ability to make these changes by separating lens fit parameters from parameters affecting refractive change. In the case of required refractive change only the parameters defining the central zone and first peripheral zone are altered.

In the case of change to lens fit, either to increase or decrease the sagittal height of the lens, or increase or decrease the lens edge lift, only the further peripheral zone parameters are altered.

According to another aspect of the disclosure there is provided a set of orthokeratology contact lenses having an optical zone having a first sagittal height and a fitting zone having a second sagittal height, wherein each contact lens in the set targets a different change in refractive power and each contact lens in the set has the same second sagittal height.

Suitably, the contact lenses in the set are contact lenses as disclosed in the first aspect of the disclosure.

According to a further aspect as disclosed herein, there is provided a method of treating refractive error in a patient comprising the steps of determining the degree of refractive power that is required, providing the stock set of contact lenses as disclosed above, obtaining a value for the radius of curvature of the cornea of the patient, selecting a contact lens from the set and causing the patient to wear the contact lens for a period of time such that the contact lens molds the front surface of the cornea of the patient, measuring corneal parameters after said period of time and determining the refractive change of the cornea and if required selecting a further contact lens from said stock set of contact lenses that targets a different change in refractive power.

Orthokeratology lenses are designed to be worn with the eye closed and the refractive correction they provide is passive in that the anterior surface is not configured for corrective refraction.

The contact lenses as disclosed herein that are orthokeratology contact lenses, may also have the anterior surface configured for use in a refractive manner such that the contact lens can provide active refractive correction when worn with an open eye.

The anterior surface may be configured for bifocal, multifocal, diffractive optic design to provide near and middle vision correction. In this manner off axis peripheral light rays can be controlled to focus anterior to central on axis light rays to provide a refraction profile that is advantageous towards slowing development of myopia.

The lenses that are described herein that are suitable for overnight wear, including vision correction contact lenses, may be configured such that the peripheral or mid peripheral posterior surface has a profile that facilitates tear exchange beneath the contact lens.

The profile may be any suitable profile and includes, grooves, undulations, channels, and the like.

An advantage of facilitating tear exchange is that there is less likelihood of post sleep contact lens binding that is a known disadvantage of contact lenses when worn overnight.

In some aspects of the contact lenses as disclosed herein, is the ability to easily create non rotationally symmetric designs to fit irregular shaped corneas. The progressive and continuous change in asphericity across the first peripheral zone enables the lens to have different sagittal heights in different meridians while maintaining tangent continuity at the junction between the central optic zone and the first peripheral zone. In this manner it is a straightforward process to create a lens that has greater sagittal depth in the vertical meridian when compared to the horizontal meridian while still using the same radius of curvature in both principal meridians. Any meridian can be altered in this way to make the lens highly adaptable.

In its non rotationally symmetric form, the peripheral zones outside of the central optic zone can be divided into equal sized quadrants each having different values so as to improve fit on asymmetric corneas. These quadrants can be set to align with the principle horizontal and vertical axes. Alternatively the progressive and continuous change in asphericity across the first peripheral zone enables the principle axes of the central zone comprising the central optic zone and first peripheral zone can be aligned differently to the peripheral zones.

Contact lens fitters have the choice of designing an empirical lens for each individual eye that they fit or to adopt a proprietary lens design and fit the lens according to the published guidelines for the design in question. Most use proprietary designs as designing a contact lens designed to fit a given eye requires significant skill in complex geometric calculation.

Selecting a contact lens to fit requires the fitter to measure the curvature profile of the cornea and cross reference this value using a slide rule or lookup table, or input into computer software, to establish the first lens to fit from a diagnostic trial set of lenses supplied by the lens manufacturer.

In order to assist lens fitters with fitting the contact lenses as disclosed herein that may in some aspects optimise the ease of fitting and/or patient treatment, the present inventors have also disclosed a system for matching a patient with a refractive error with a stock contact lens for the patient comprising:
  a processor;
  an electronic display;
  a database containing information of parameters of a plurality of sets of stock contact lenses as disclosed herein;
  a memory that contains instructions that are readable by the processor to control the processor to:
    a) receive refractive error correction information for a patient;
    b) receive corneal topography information for the patient;
    c) calculate a cornea model of the patient from the received corneal topography information;
    d) match at least one contact lens within the plurality of sets of stock lenses to the patient based upon the received refractive error correction and calculated cornea model; and
    e) display the match on the electronic display.

The memory may further comprise instructions that are readable by the processor to calculate parameters for an empirical contact lens for the patient from the received refractive error correction and calculated cornea model.

In this case, the system may further comprise an interface through which a user can interact with the processor to make a selection of a stock lens or an empirical lens such that if an empirical lens is selected, the parameters for the empirical lens are calculated instead of matching with a stock lens.

Alternatively, the memory may have instructions for formatting empirical lens parameters and does not match a stock lens.

According to a further aspect, there is disclosed a system for designing an empirical contact lens for a patient with a refractive error comprising:
  a processor;
  an electronic display;
  a memory that contains instructions that are readable by the processor to control the processor to:
    (a) receive refractive error correction information for a patient;
    (b) receive corneal topography information for the patient;
    (c) calculate a cornea model of the patient from the received corneal topography information; and
    (d) calculate parameters for the empirical contact lens for the patient from the received refractive error correction and calculated cornea model.

The systems that calculate parameters for an empirical lens suitably further include a communications module for communicating the parameters for the empirical lens over a network to a contact lens manufacturer.

The memory may further provide instructions to format the communicated parameters for the empirical lens as a computer readable program code for issuing instructions to a lathe used to produce the contact lens from a blank.

Thus there is also disclosed a method of manufacturing a contact lens for a patient having a refractive error comprising calculating the parameters as disclosed above and communicating the parameters as a computer readable program code for issuing instructions to a lathe to produce the contact lens from a blank Suitably in any of the above disclosed systems, the system may include a communications module for communicating with a cloud database for storing one or more of patient identification data, refractive error information, corneal topography data, cornea model, matched stock lens or empirical lens parameters.

When the contact lens that has been matched or manufactured as disclosed above is an orthokeratology lens is first fitted, overnight wear is commenced using the lens and the eye is assessed when the lens is removed to determine the refractive effect that is achieved.

While refraction can be measured using standard optometric techniques that require only trial lenses and a test chart, determining how well the lens is fitting can only be established from measuring the change that the orthokeratology lens has made to the curvature profile of the cornea. Computerised corneal topography analysis is required to make this judgement, with the instrument software subtracting post-wear corneal curvature data from pre-wear data to display what is typically described as a corneal topography difference map.

The orthokeratology lens fitter is required to visually interpret these maps to guide the published fitting process for the respective design. If the published directions are followed correctly with good interpretation of clinical outcomes, these proprietary designs typically yield positive outcomes. However, there is considerable scope for misinterpretation of clinical outcomes, particularly if the practitioner is inexperienced in orthokeratology lens fitting, leading to poor visual outcomes and potentially sight threatening adverse effects.

As orthokeratology continues to gain popularity with the public more contact lens fitters are choosing to add orthokeratology lens fitting to their repertoire, often without training. Consequently, an increasing amount of lens manufacturer personnel time is being spent answering requests from orthokeratology fitters to remotely assist them in assessing clinical outcomes from orthokeratology lens wear towards achieving successful fitting outcomes.

It would be desirable to provide an orthokeratology lens design that simplifies the orthokeratology fitting process further in particular through offering a computerized system that is suitably cloud based that can import the measured corneal topography data and return guidance on the next lens to fit.

Furthermore, through adopting a cloud based computing system and learning algorithms aided by interpretation from experienced orthokeratology lens fitters, the software would continually improve the accuracy of its decisions. This would reduce reliance on manufacturing laboratories on in-house specialists as the cloud based data storage platform enables remote access to designated experienced orthokeratology fitters throughout the world.

The cloud based database suitably includes centralised data obtained from a plurality of lens fitting practitioners, the data relating to patients undergoing orthokeratological treatment, wherein the stored data includes a patient identifier, a corneal model for the patient calculated at a time t1 and parameters of a first orthokeratology lens that the patient was being treated with at time t1.

The database may further include for the same patient a further corneal model for the patient calculated at a time t2 and the parameters of a second orthokeratology lens that the patient was being treated with at time t2.

The centralised database is updated continuously with new patient data.

The database may be used in a system, method and computer program for assessing the progress of orthokeratological treatment and may also assist in fitting a new lens.

Disclosed herein is a system for assessing the progress of orthokeratological treatment comprising:

a database containing patient information including a patient identifier, at least one corneal model for the patient calculated at spaced time intervals during treatment and the parameters of the orthokeratology contact lens used by the patient at the time the corneal measurements were made from which the corneal model was calculated and information relating to refractive change patterns that have been assessed as successful for a plurality of patients:

a processor;

a communication module for electronic communication between the processor; and a memory that contains instructions that are readable by the processor to control the processor to:

receive a patient identifier;

communicate with the database to match the patient identifier with a patient identifier in the database and retrieve from the database the most recent corneal model of the patient and the contact lens being used by the patient at the relevant time;

receive current corneal topography data from the patient;

calculate from the retrieved and received corneal topography data to calculate corneal topography shape change caused by the most recent contact lens;

receive refractive error correction information for a patient;

assess the pattern of refractive change caused by the contact lens; and interrogate the database to compare the assessed pattern of refractive change with the stored successful patterns of change and based upon the comparison assess if the current contact lens needs to be altered and if the contact lens does not need to be altered sore the data in the database as a successful outcome.

The corneal topography data for use in the methods and systems disclosed herein may be obtained using conventional corneal topography instruments. Such instruments are expensive and not all lens fitters have a dedicated corneal topographer. In order to assist a lens fitter to practice the methods and systems described herein, the present inventors have developed a corneal topography attachment for a portable electronic device having an inbuilt camera.

In one aspect, there is disclosed a corneal topographer device for use in conjunction with a portable electronic device having an inbuilt camera, the device comprising:

a mounting part for mounting the attachment device onto the portable electronic device, the mounting part having an aperture that when the device is mounted on the portable electronic device is aligned with the lens of the camera;

a second component part that is frustoconical in shape having a narrowed base end adjacent the mounting part, a widened opposed end and a series of inner spaced concentric transparent and opaque rings; and an opaque housing part about the second component having an open base end adjacent the mounting part such that part of the open base end is in alignment with the aperture for alignment with the lens of the camera and an opposed end configured to The portable electronic device may be any suitable device such as a mobile phone, PDA or computer tablet.

The corneal topography device is used in association with a light source for illuminating the second component so as to create a concentric illuminated ring pattern that can be projected onto an eye to be measured. The housing shields the light source.

The light source may be an inbuilt flash on the electronic device. In this arrangement the mounting part includes a lens for focusing the flash. Alternatively the mounting part may include an inbuilt light source such as LED light(s), a small rechargeable battery, on/off switch and associated circuitry to control the LED illumination and battery charging through a USB interface. The mounting part also contains a focussing lens calculated to ensure correct focus of the eye being image.

The mounting part can be designed to fit any smart phone that includes a camera and has the purpose of aligning the second component with the camera of the electronic device.

The purpose of the inner second component is to distribute the light to create a concentric illuminated ring pattern that can be projected onto the eye being measured.

The outer housing is used to shield the light source.

The three parts, being the mounting part, second component and housing may be formed either separately or integrally formed.

When in individual parts, the outer housing aligns the inner component correctly with the mounting part so as to create a firm attachment with the base so as to create a single unit.

To use the device specific application software for the electronic device will be installed, which once installed and running will guide the image capture process. Once the device is correctly aligned the software will automatically capture an image of the eye that contains the focussed ring images projected by the second component. The software then uses image recognition techniques to assess the location of each ring and through a mathematical process reconstruct the three dimensional shape of the cornea measured using the known position of the inner cone at the time of image capture and the measured ring spacing on the captured image.

Once processed, the corneal topography data can be exported to the software described above that controls the contact lens fitting process, or utilised using contact lens fitting software installed on the phone. In this manner the corneal topography device offers a low cost solution to measuring corneal shape that extends the use of corneal topography measurement. For example it will allow any contact lens fitter that doesn't have access to a corneal topographer to be able to fit orthokeratology contact lenses.

The device also allows the contact lens wearer to take corneal topography measurements that can be stored on the smart phone and transmitted to the lens fitter to assist in fitting evaluation over time.

DETAILED DESCRIPTION

Figure 1:
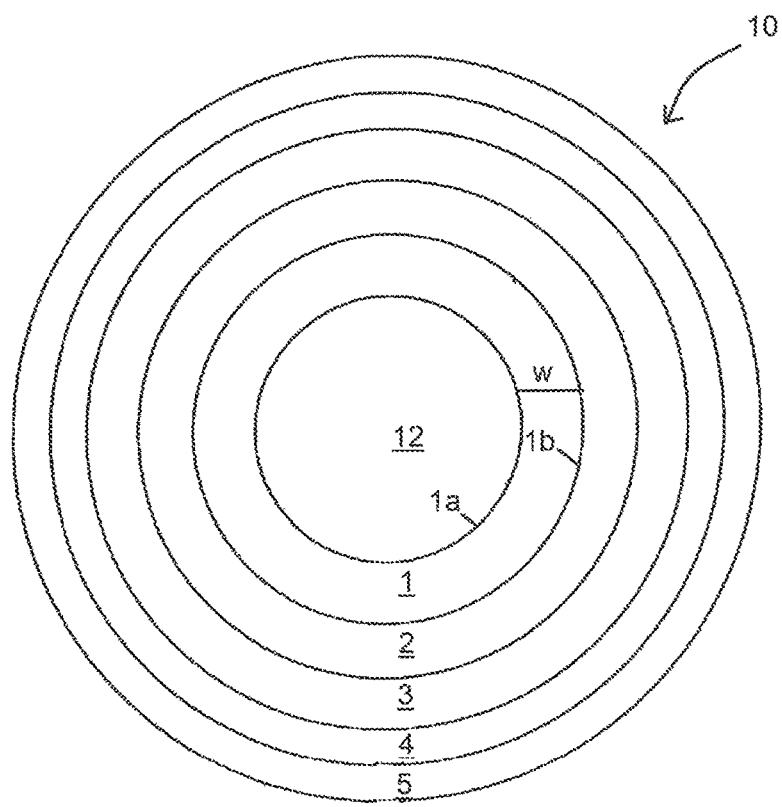
FIG. 1 is a schematic plan view of one aspect of a contact lens as disclosed herein.
Figure 2:
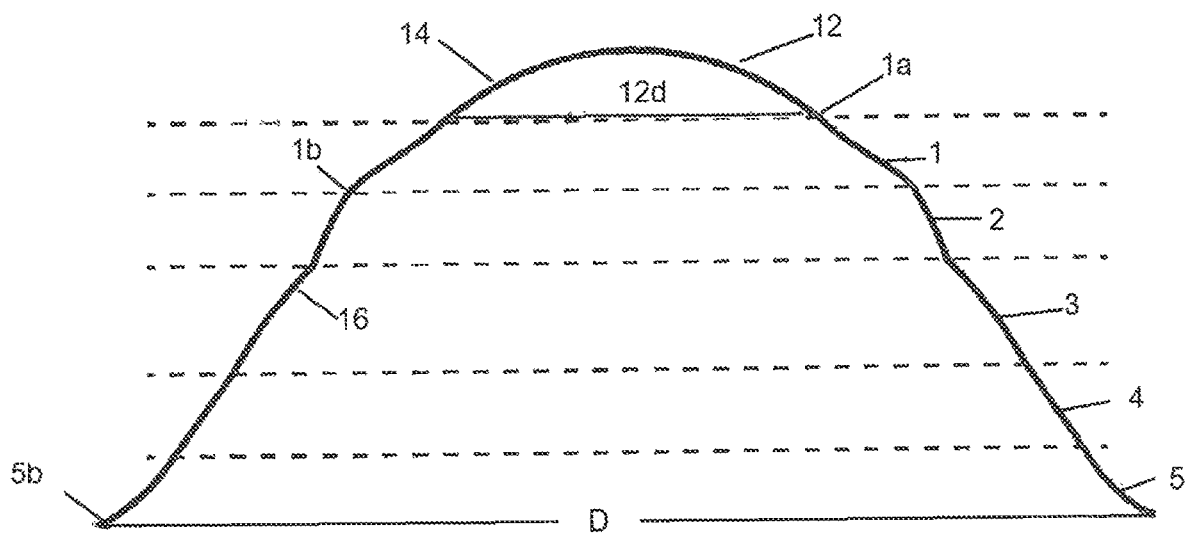
FIG. 2 is a schematic cross section of the contact lens of FIG. 1.

FIGS. 1 and 2 respectively show a schematic plan view and cross section of one aspect of a contact lens 10 as disclosed herein.

The contact lens 10 includes a spherical central optic zone 12, surrounded by five peripheral zones 1, 2, 3, 4, 5. The central optic zone 12 has a diameter of between 2 mm and 5 mm and is constructed from a spherical curve.

The contact lens 10 has an anterior surface 14 facing outwardly away from the cornea and a posterior surface 16.

The first peripheral zone 1 has a width of between 0.5 and 2 mm and is constructed from a graduating aspheric curve with a value of zero at the junction 1a with the central zone and a defined amount of asphericity at the outer edge 1b of the zone 1.

The second peripheral zone 2 and third peripheral zone 3 have individual widths of between 0.1 and 2 mm and are each constructed from a spherical curve.

The fourth peripheral zone 4 has a width of between 0.1 and 2 mm and is constructed from a straight line segment.

The final peripheral zone 5 has a width of between 0.1 and 2 mm and is constructed from a spherical curve that has the opposite profile to the second 2 and third peripheral 3 zones.

The outside diameter D of the lens 10 is defined as the outer edge of the final peripheral zone 5, and has a diameter of between 9 to 12 mm.

The central zone 12 is formed from a spherical section with the principal axis aligned with the center, also known as the apex, of the central zone, and a radius of curvature between 4 and 12 mm.

When designing the lens for a given eye the radius of curvature is calculated to differ from the corneal radius of curvature by the amount of refractive change required. Radius of curvature can be converted from mm to equivalent refractive power using a refractive index of 1.3375, which is the widely agreed average value of refractive index for the human cornea. Adopting the same refractive index for the lens surface allows easy calculation of the radius of curvature for the central zone 12, with the required radius of curvature for the central zone 12 in diopters being equal to the radius of curvature of the cornea in diopters+the refractive change required.

For example for a cornea of radius 7.6 mm and targeted refractive change of −3D the radius of the cornea in diopters is (1-1.3375)/7.6=45 D. The required radius of curvature of the central zone 12 in diopters is 45 D+−3D=42 D. The required radius of curvature of the central zone in mm is (1.1.3375)/42 D=8.04 mm.

From the previous example it can be seen that to correct myopia the radius of curvature for the central zone 12 has a larger radius of curvature than the radius of curvature of the cornea, indicating that the curvature for the central zone 12 is flatter than that of the cornea.

The radius of curvature for the first peripheral zone 1 is identical to the radius of curvature for the central zone 12. The curve forming the first peripheral zone 1 is spherical at the inner edge 1a of the zone adjacent to the central zone 12 and aspheric at the outer edge 1b of the zone adjacent to the second peripheral zone 2.

Across the width w from the inner 1a to outer 1b margins of the first peripheral zone 1, the asphericity of curvature increases from zero, being spherical, to a calculated value of asphericity at the outer margin.

Asphericity is a term given to define the rate of flattening of an elliptical surface. An asphericity value of 0 is equivalent to a spherical surface; a negative value of asphericity indicates a flattening, also known as prolate, elliptical surface and a positive value of asphericity indicates a steepening, also known as oblate, elliptical surface.

In the present disclosure the asphericity of the curve at the outer margin 1b of the zone 1, in a preferred aspect asphericity can be defined as negative through positive by a value of asphericity between −3 and +3. If the asphericity is zero at the outer margin 1b the curvature across the whole zone is spherical. The change from zero asphericity at the inner margin 1a of the zone 1 to the required amount of asphericity at the outer margin is calculated using a cubic function where the asphericity value at any point is defined as:

Required outer edge asphericity*root of(difference between the inner margin position and measurement point)

For example, if the central zone 12 has a radius of curvature of 8 mm, the radius of curvature of the first peripheral zone 1 will also be 8 mm. The asphericity at the inner margin 1a of the first peripheral zone will be zero and in this example the asphericity at the outer margin 1b of the first peripheral zone is required to be −0.6, indicating a prolate flattening elliptical surface.

In this example the width of the first peripheral zone 1 is 1 mm. Table 1 indicates the change in asphericity across the first peripheral zone as a function of distance from the inner margin 1a for this example.

TABLE 1

| Distance from inner margin (mm) | Radius of curvature (mm) | Asphericity |
|---|---|---|
| 0 | 8 | 0 |
| 0.1 | 8 | −0.006 |
| 0.2 | 8 | −0.024 |
| 0.3 | 8 | −0.054 |
| 0.4 | 8 | −0.096 |
| 0.5 | 8 | −0.15 |
| 0.6 | 8 | −0.216 |
| 0.7 | 8 | −0.294 |
| 0.8 | 8 | −0.384 |
| 0.9 | 8 | −0.486 |
| 1 | 8 | −0.6 |

In this manner the first peripheral zone 1 by virtue of being spherical at the inner margin 1a and of the same radius of curvature as the inner zone 12 maintains tangent continuity to create a smooth transition from the inner zone 12 into the first peripheral zone 1.

This satisfies an important requirement of providing a smooth surface for the area of the lens 10 that is in compressive contact with the cornea.

Previous proposals in the art have described the use of multiple defined zones to form the central and first peripheral zones. Multiple zones can be formed in such a way in a stepwise manner as to allow tangential continuity between zones, but by virtue of being discrete bands they will always have the same radius and asphericity at the start and end of each band.

The presently disclosed lenses instead offer a gradual change in asphericity across the entire width of the zone in a non-stepwise manner and provides for a much greater degree of fine control than is offered by the conventional step-wise lenses.

The second peripheral zone 2 and third peripheral zone 3 are both formed from spherical sections with their center of curvature positioned along the central axis of the lens and each having radii of curvature of between 3 and 15 mm. The purpose of these zones is to realign the lens with the corneal surface. To achieve this the second peripheral zone 2 and third peripheral zone 3 will each have a steeper radius of curvature than the central zone 12 and first peripheral zone 1.

Figure 3:
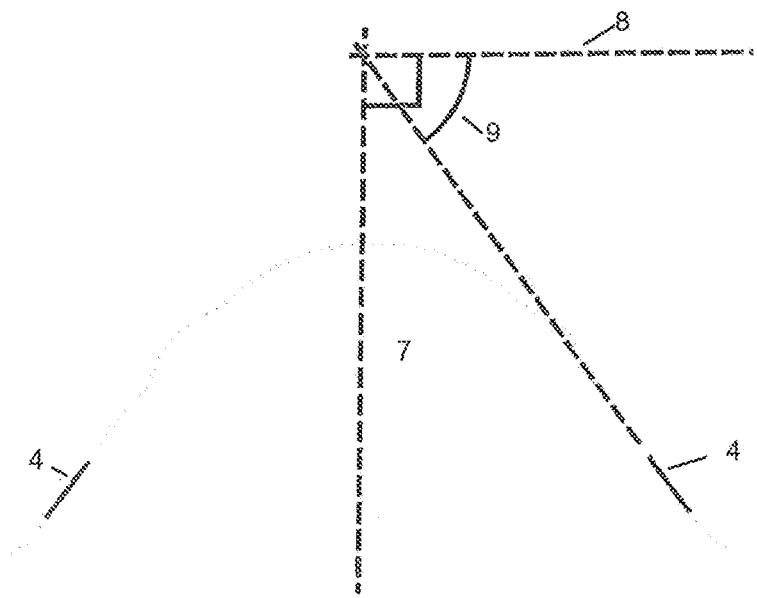
FIG. 3 is a schematic cross section of the contact lens of FIG. 1 view showing the angle of the fourth peripheral zone.

The fourth peripheral zone 4 is constructed to form a flat surface which in section will be shown as a straight line. This is shown in FIG. 3. in which the line extends so as to form an angle 9 is with a tangent 8 to the central axis of the lens 7. Angle 9 is given the term 'Landing Angle' and is calculated to bring the contact lens surface into tangent continuity of the underlying cornea at a defined location along the fourth peripheral zone 4.

The fifth peripheral zone 5 is formed from a spherical section that has the reverse profile to the other spherical zones 2 and 3 of the lens design in that the center of curvature for the surface is anterior to the surface. This causes the most peripheral aspect of the surface to move away from the corneal surface to create what is known in the art as edge lift. The edge lift is analogous to the front of a ski which in the case of a contact lens prevents the edge of the lens digging into the eye and promotes flow of tears below the lens. The fifth peripheral zone 5 has a radius of curvature of between 4 and 15 mm with the radius center positioned to create tangent continuity at the junction with the fourth peripheral zone 4.

The contact lenses 10 as disclosed herein can be calculated on an empirical basis to fit a given cornea or manufactured into range of stock lenses designed to fit the majority of normal eyes.

In its empirical format the lens specifications are calculated in response to measurements of corneal shape taken by the lens fitter. Computer processed mathematical algorithms are used to build a mathematical model of the cornea depending on the information that is supplied by the lens fitter.

The simplest corneal measurement that can be supplied by the lens manufacturer is the equivalent spherical shape defined by a radius of curvature, which is measured using an instrument called a Keratometer. For this reason, this value is called a keratometry measurement. Modern day computerized corneal topography instruments provide more detailed information on corneal shape which can be used to create an elliptical model of the cornea. Whether a spherical model of the cornea is created from keratometry measurements, or an elliptical model is created from computerized corneal topography measurements the lens design process is the same.

The corneal measurements that form the basis of the calculations below are (1) the radius of curvature, (2) the sagittal height and (3) the mathematical slope of the cornea at a chord which coincides with the location of fourth peripheral zone 4.

Figure 4:
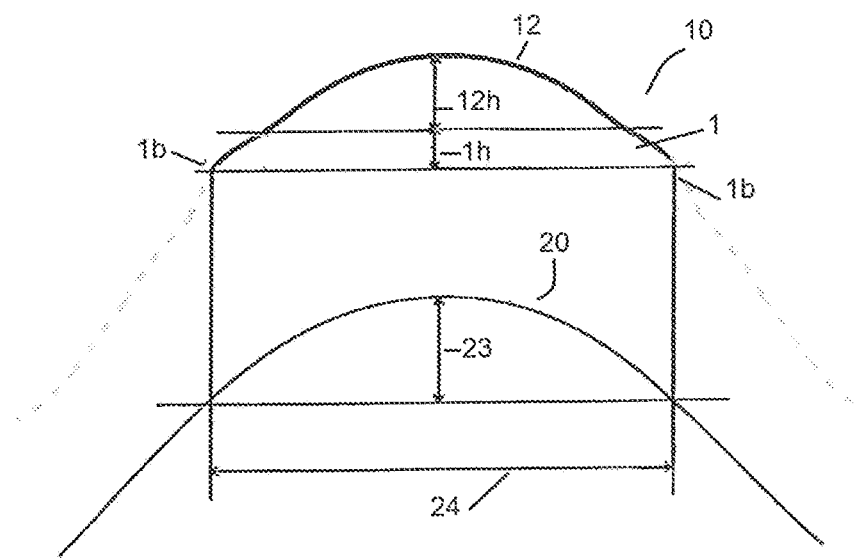
FIG. 4 is a schematic cross section of the contact lens of FIG. 1 in comparison with a cornea model and comparing sagittal heights of the central and first peripheral zones.

1. The radius of curvature of the central zone 12 is calculated according to the principles described earlier, where the radius of curvature is flatter than the central corneal radius by the amount of refractive change being targeted.
2. The diameter 12d of the central zone 12 is set according to the lens fitters requirements. For correcting refractive error, the diameter is suitably set with a default value of 4 mm. For myopia control, the central zone may be set at a diameter less than 4 mm, suitably about 3 mm.
3. The radius curvature of the first peripheral zone 1 is given the same value as the central zone 12.
4. The width w1 of the first peripheral zone 1 is set according to the lens fitters requirements. Typically, the width of the first peripheral zone 1 is calculated to be the difference between half of the central zone diameter 12d and 3 mm. In this manner for a 4 mm central zone diameter the default width of the first peripheral zone is 3 mm−(4 mm/2)=3 mm−2 mm=1 mm.
5. FIG. 4 shows the model 20 of the cornea to be fitted. The sagittal height 23 of the cornea model 20 being fitted is calculated across the chord 24 defined by the outer margins 1b of the first peripheral zone 1.
6. The required change in height 1h across the first peripheral zone 1 is calculated by subtracting the sagittal height 12h of the central zone 12 from the sagittal height 23 of the cornea 20 being fit and then adding the lens clearance at the outer edge 1b of the first peripheral zone that is required—the default value being 55 um.
7. The asphericity value for the first peripheral zone 1 is calculated to provide the exact change in height across the first peripheral zone 1 established in Step 6 of the process.

Figure 5:
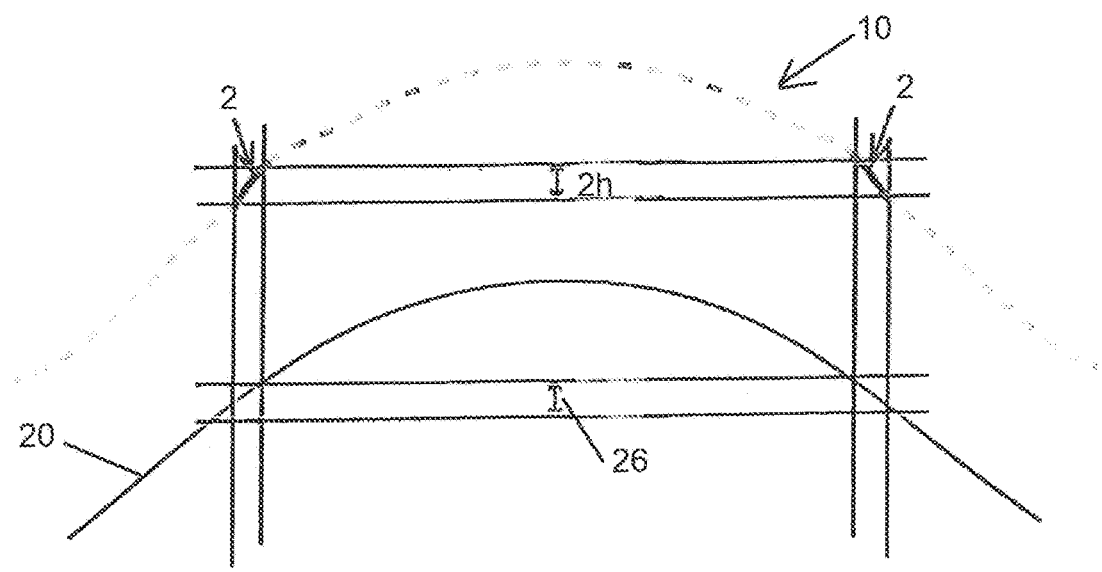
FIG. 5 is a schematic cross sectional view of the contact lens of FIG. 1 in comparison with a cornea model and comparing sagittal heights of the second peripheral zone.

8. As shown in FIG. 5 the sagittal height 26 across the band of the cornea model 20 being fitted that is coincident with the second peripheral zone 2 is calculated from the corneal model 20. The sagittal height 2h of the second peripheral zone 2 needs to be the same as the corneal sagittal height 26. This is achieved by calculating the radius of curvature that provides the measured sagittal height 26.

Figure 6:
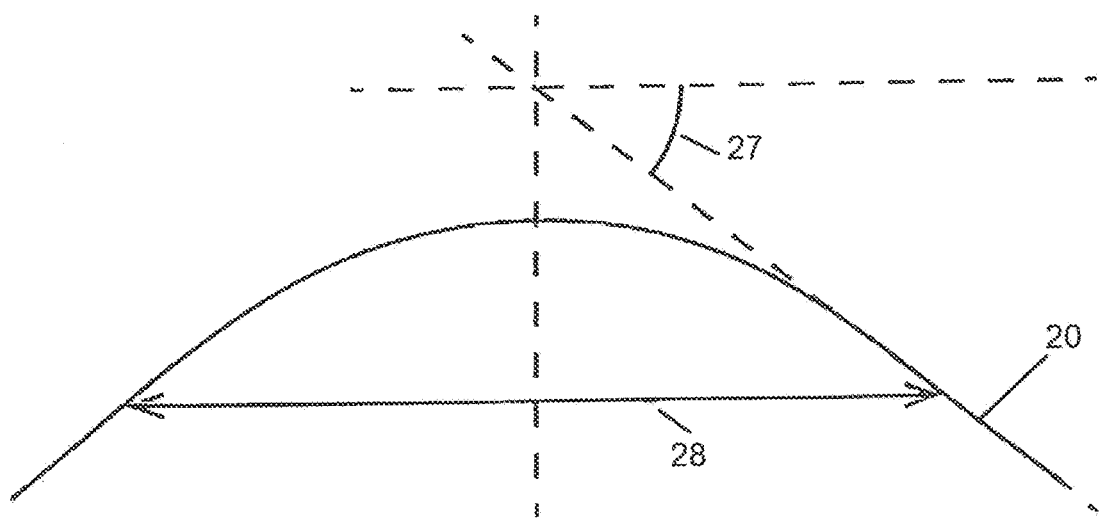
FIG. 6 is a cross section of the cornea model showing the slope at a defined chord.

9. As shown in FIG. 6 the mathematical slope 27 of the cornea model 20 at a defined chord 28 is calculated. The slope of the fourth peripheral zone 4 is given the same value as the cornea slope 27.

Figure 7:
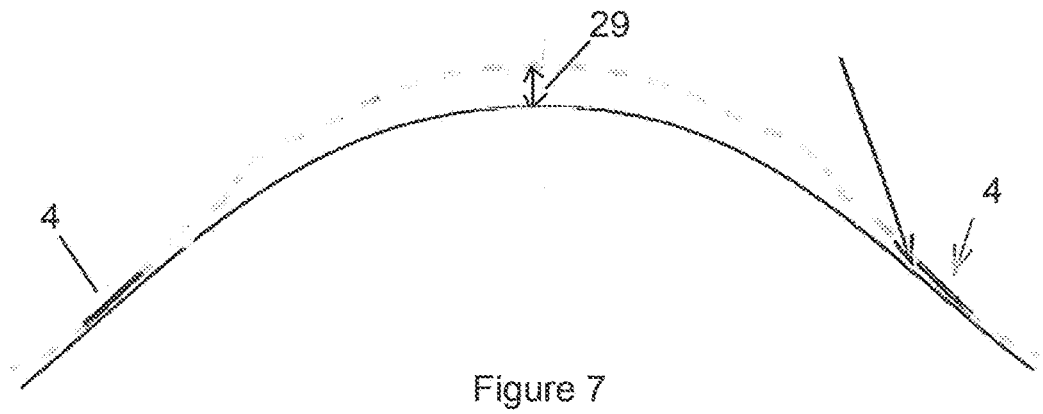
FIG. 7 is a schematic cross section of the contact lens of FIG. 1 imposed upon the cross section of the cornea model.

10. FIG. 7 shows how the slope 27 measured in Step 9 of this method is mathematically calculated back to the start of the fourth peripheral zone 4 to calculate the difference in height 29 compared to the cornea model 20.

Figure 8:
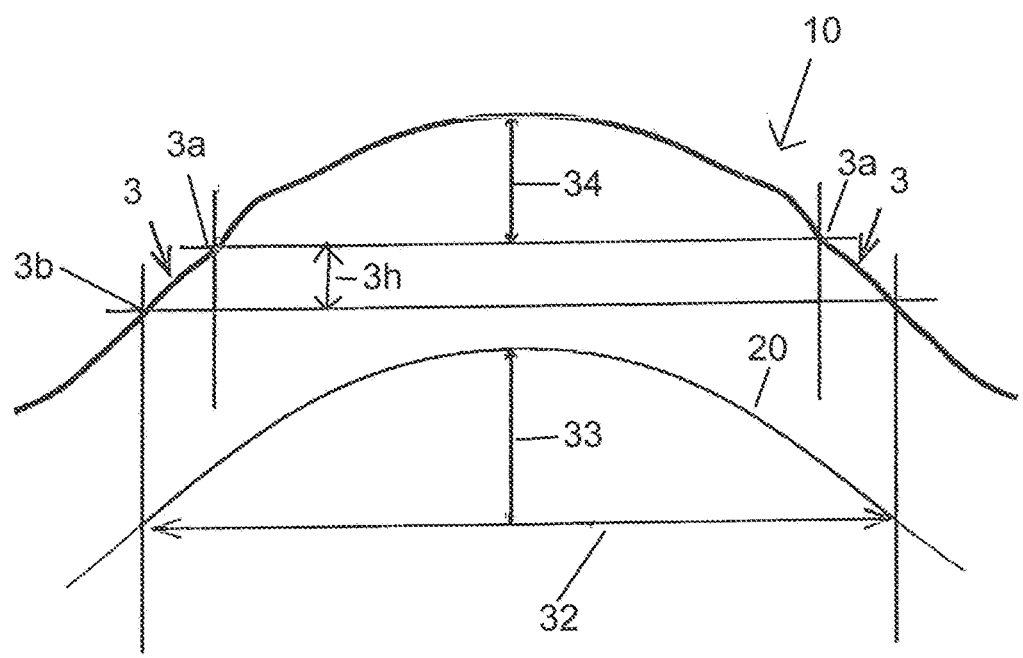
FIG. 8 is a contact lens of FIG. 1 in comparison with a cornea model and comparing sagittal heights of the third peripheral zone.

11. FIG. 8 shows how the radius of curvature of the third peripheral zone 3 is calculated by first determining the sagittal height 34 of the lens 10 at the start 3a of the third peripheral zone 3, which is easily calculated as the combined sagittal height of the already calculated central zone 12, first 1 and second 2 peripheral zones.

The sagittal height change 3h required across the third peripheral zone 3 is the sagittal height of the cornea model 20 at the chord 32 coincident with the outer end 3b of the third peripheral zone 3, less sagittal height 34 of the lens at the start 3a of the third peripheral zone 3, plus the difference in height 29 to the corneal model 20 calculated in Step 10 of this method. Once the sagittal height change 3h required across the third peripheral zone 3 is known, the radius required to provide this measurement is a simple mathematical process.

Figure 9:
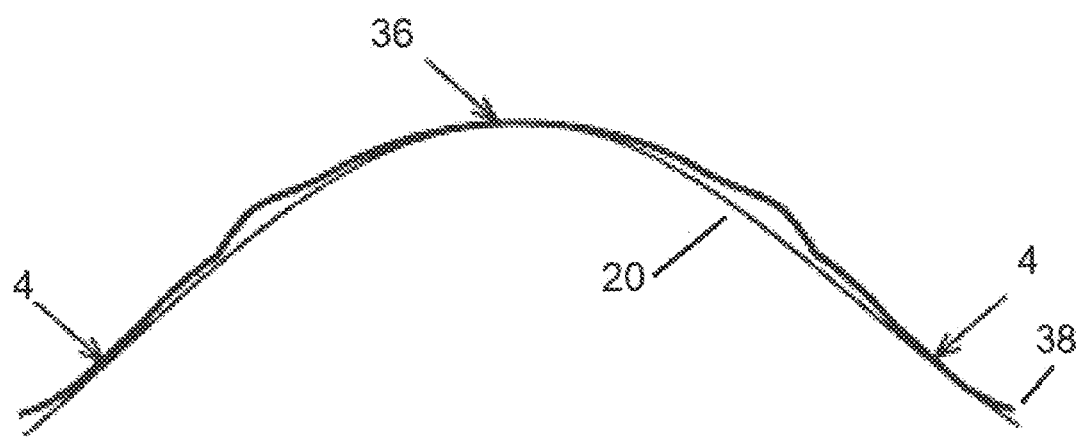
FIG. 9 is a cross section of the contact lens of FIG. 1 overlying the cornea model.

12. At this stage the parameters of the central zone 12, first peripheral zone 1, second peripheral zone 2, third peripheral zone 3 and fourth peripheral zone 4 have all been calculated. Joined together these form the bulk of the lens 10 which, as shown in FIG. 9, will now rest exactly on the cornea model 20 to align with the cornea model at the apex 36 and align with the cornea model 20 within the fourth peripheral zone 4.

13. The radius of the fifth and final peripheral zone 5 is defined according to the clearance between the edge 38 of the lens 10 and the corneal model 20 that is required. A smaller radius creates greater edge lift and increasing the radius reduces edge lift.

The construction of the stock lens parameters is handled in a similar way. Corneal topography data was sampled from 900 subjects to establish an average corneal topography profile distribution to extrapolate to the population at large. These data were segregated into 30 subgroups by their sagittal heights with a sagittal difference of 9 μm between subgroups.

Individual corneal data within each subgroup were analyzed to measure the apical curvature and mathematical slope at a chord of 9.35 mm. These apical curvature and slope data were then averaged within each subgroup.

The lens calculation process previously described was applied to each subgroup using the highest sagittal height value, subgroup average apical curvature, subgroup average corneal slope at 9.35 mm chord value and a targeted refractive error correction of −3.00 diopters. The central zone was formed over a diameter of 4 mm, the first peripheral zone width was 1 mm, the second peripheral zone width was 0.5 mm, the third peripheral zone was 0.9 mm.

To allow easy lens fitting without need for look up tables or further computer calculations each stock lens parameter is given an identification value equal to the central zone radius in diopters less the refractive power being targeted. For example the lens with central zone radius in diopters of 36.50 less −3.00 targeted change has a lens identifier value of 39.50. This makes the lens identifier close in value to the keratometry value of the cornea model that it was used to create the lens, making it possible to fit the lens by keratometry value alone.

The full range of these lenses is shown in Table 2.

TABLE 2

| Central zone radius in dioptres | Central zone radius in mm | Sagittal height | Lens identifier |
|---|---|---|---|
| 36.50 | 9.247 | 1.38301 | 39.5 |
| 36.75 | 9.184 | 1.39042 | 39.75 |
| 37.00 | 9.122 | 1.39668 | 40 |
| 37.25 | 9.06 | 1.40559 | 40.25 |
| 37.50 | 9 | 1.41499 | 40.5 |
| 37.75 | 8.94 | 1.42444 | 40.75 |
| 38.00 | 8.882 | 1.43337 | 41 |
| 38.25 | 8.824 | 1.44408 | 41.25 |
| 38.50 | 8.766 | 1.45437 | 41.5 |
| 38.75 | 8.71 | 1.46440 | 41.75 |
| 39.00 | 8.654 | 1.47361 | 42 |
| 39.25 | 8.599 | 1.48214 | 42.25 |
| 39.50 | 8.544 | 1.49048 | 42.5 |
| 39.75 | 8.491 | 1.49920 | 42.75 |
| 40.00 | 8.438 | 1.50857 | 43 |
| 40.25 | 8.385 | 1.51875 | 43.25 |
| 40.50 | 8.333 | 1.52820 | 43.5 |
| 40.75 | 8.282 | 1.53954 | 43.75 |
| 41.00 | 8.232 | 1.54999 | 44 |
| 41.25 | 8.182 | 1.56030 | 44.25 |
| 41.50 | 8.133 | 1.57244 | 44.5 |
| 41.75 | 8.084 | 1.58335 | 44.75 |
| 42.00 | 8.036 | 1.59260 | 45 |
| 42.25 | 7.988 | 1.60257 | 45.25 |
| 42.50 | 7.941 | 1.61493 | 45.5 |
| 42.75 | 7.895 | 1.62667 | 45.75 |
| 43.00 | 7.849 | 1.63805 | 46 |
| 43.25 | 7.803 | 1.64869 | 46.25 |
| 43.50 | 7.759 | 1.65708 | 46.5 |
| 43.75 | 7.714 | 1.66636 | 46.75 |

To allow correction of different refractive errors for a range of −1.00 D to −4.50 D each lens in the range shown in Table 2 was expanded as follows. All peripheral zones except the first peripheral zone were not changed. The sagittal height at the outer end point of first peripheral zone was calculated and recorded to aid later calculations. The radius of the front central zone when measured in diopters was altered by the difference between the required targeted refractive and −3.00 D. For example, to create the −3.50 D target lens for the lens identified by lens identifier 45.00 D which has a central zone radius of 42.00 D, the new central zone radius will be −3.50 D less −3.00 D equals −0.50 D, which is then added to 42.00 D to give a new central zone radius of 41.50 D.

The sagittal height of the new central zone is then calculated and subtracted from the previously recorded sagittal height at the outer end point of first peripheral zone to establish the sagittal height change required across the first peripheral zone. Finally, the curvature of the asphericity is changed to match the new central zone radius and the asphericity of the first peripheral zone is calculated to provide the required change in sagittal height across the first peripheral zone. This process is repeated to cover steps of refractive target in −0.50 D from −1.00 D to −4.50 D. In this manner the stock range includes 240 lenses encompassing lens identifiers 39.50 to 46.75 in 0.25 steps and powers −1.00 to −4.50 D in 0.50 D steps.

Fitting a stock lens is performed by simply measuring the keratometry value of the cornea to be fitted and establishing the refractive error to target. For example, a cornea with 42.50 D keratometry value and targeted −2.50 D correction would be fitted with a lens identified at 42.50 with −2.50 D correction.

The contact lens in accordance with this aspect of the disclosure by using the novel approach of maintaining consistent sagittal height measured at the outer limit of the first peripheral zone independent to the degree of refractive power being targeted allows greater prediction of change required at lens fit follow up visits. Assessment of a good fitting orthokeratology lens is currently established using existing lens designs by assessing the change that the lens has made to corneal shape during overnight wear, and altering lens parameters to compensate any shortfall identified from the corneal topography analysis. The contact lenses disclosed in some aspects improves the ability to make these changes by completely separating lens fit parameters from parameters affecting refractive change. In the case of required refractive change only the parameters defining the central zone and first peripheral zone are altered. In the case of change to lens fit, either to increase or decrease the sagittal height of the lens, or increase or decrease the lens edge lift, only the second, third, fourth and fifth peripheral zone parameters are altered.

Figure 10:
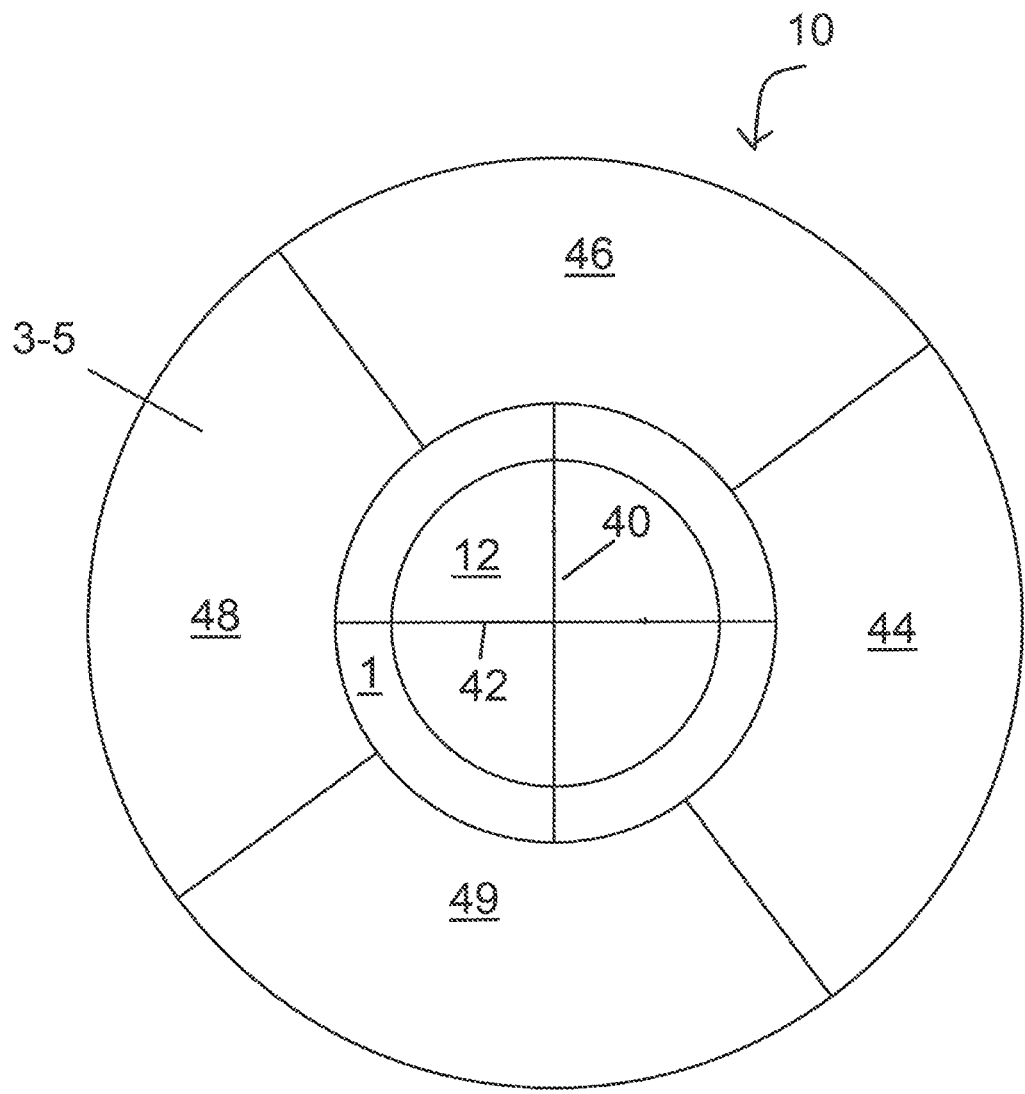
FIG. 10 is a schematic view of a contact lens.

FIG. 10 is a schematic view of the contact lens 10 that has a non rotationally symmetric design to fit irregular shaped corneas. The progressive and continuous change in asphericity across the first peripheral zone enables the lens to have different sagittal heights in different meridians while maintaining tangent continuity at the junction between the central zone and the first peripheral zone.

In this manner it is a straightforward process to create a lens that has greater sagittal depth in the vertical meridian 40 when compared to the horizontal meridian 42 while still using the same radius of curvature in both principal meridians. Any meridian can be altered in this way to make the lens highly adaptable.

In its non rotationally symmetric form, the peripheral zones 3-5 outside of the central zone can be divided into equal sized quadrants 44, 46, 48, 49 each having different values so as to improve fit on asymmetric corneas. These quadrants can be set to align with the principle horizontal and vertical axes.

Alternatively the progressive and continuous change in asphericity across the first peripheral zone enables the principle axes of the central zone comprising the central optic zone and first peripheral zone to be aligned differently to the peripheral zones.

To utilize the new benefits provided by the present contact lens a new computer software process has been created to assist orthokeratology lens fitting practitioners with lens fitting. The computer software is provided with the full refractive error of the eye being corrected and measurements of corneal topography, either as user typed input with minimum requirement of measured corneal keratometry value or by directly importing the captured corneal topography map. The software uses these values to establish the best fit stock lens for the practitioner to select or calculate the empirical lens specification for bespoke individual manufacture.

Figure 11:
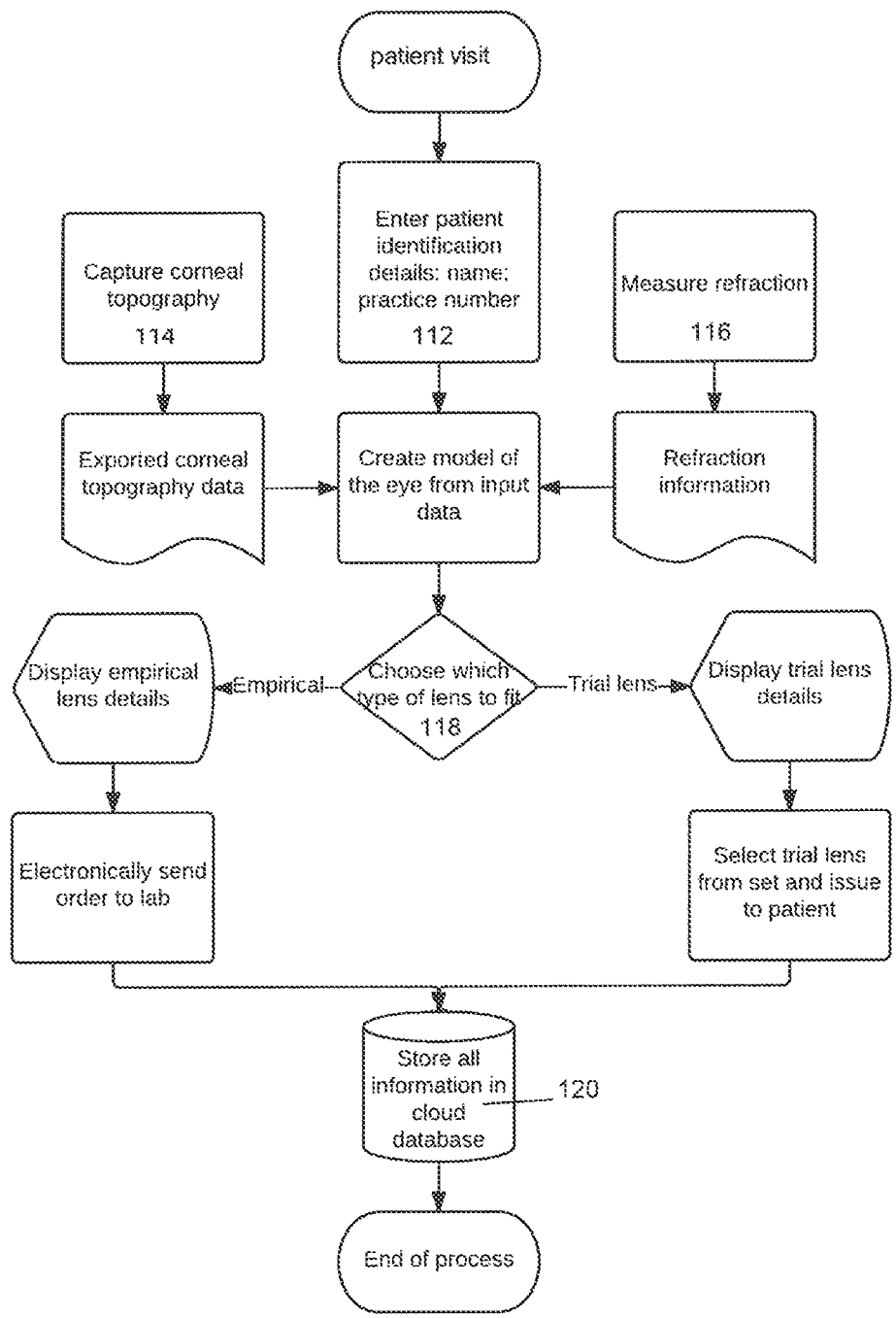
FIG. 11 is a flow chart showing a lens fitting procedure according to one aspect of the disclosure.

FIG. 11 shows a flow chart illustrating an example of an initial lens fitting process.

In a first step 111, patient identification data is entered into a cloud based database. The patient's corneal topography is captured 114 and a cornea model is created 116 according to known methods. The patient's refraction is then measured. The lens fitter chooses to fit 118 either an empirical lens of or a trial lens from a stock sets of lenses as described above.

All information regarding lens profile and patient's refraction measurements are stored in the cloud database 120.

At the follow up visit the practitioner assess corneal topography by measuring the corneal surface using a computerised corneal topography measurement instrument and importing the captured data into the software.

Figure 12:
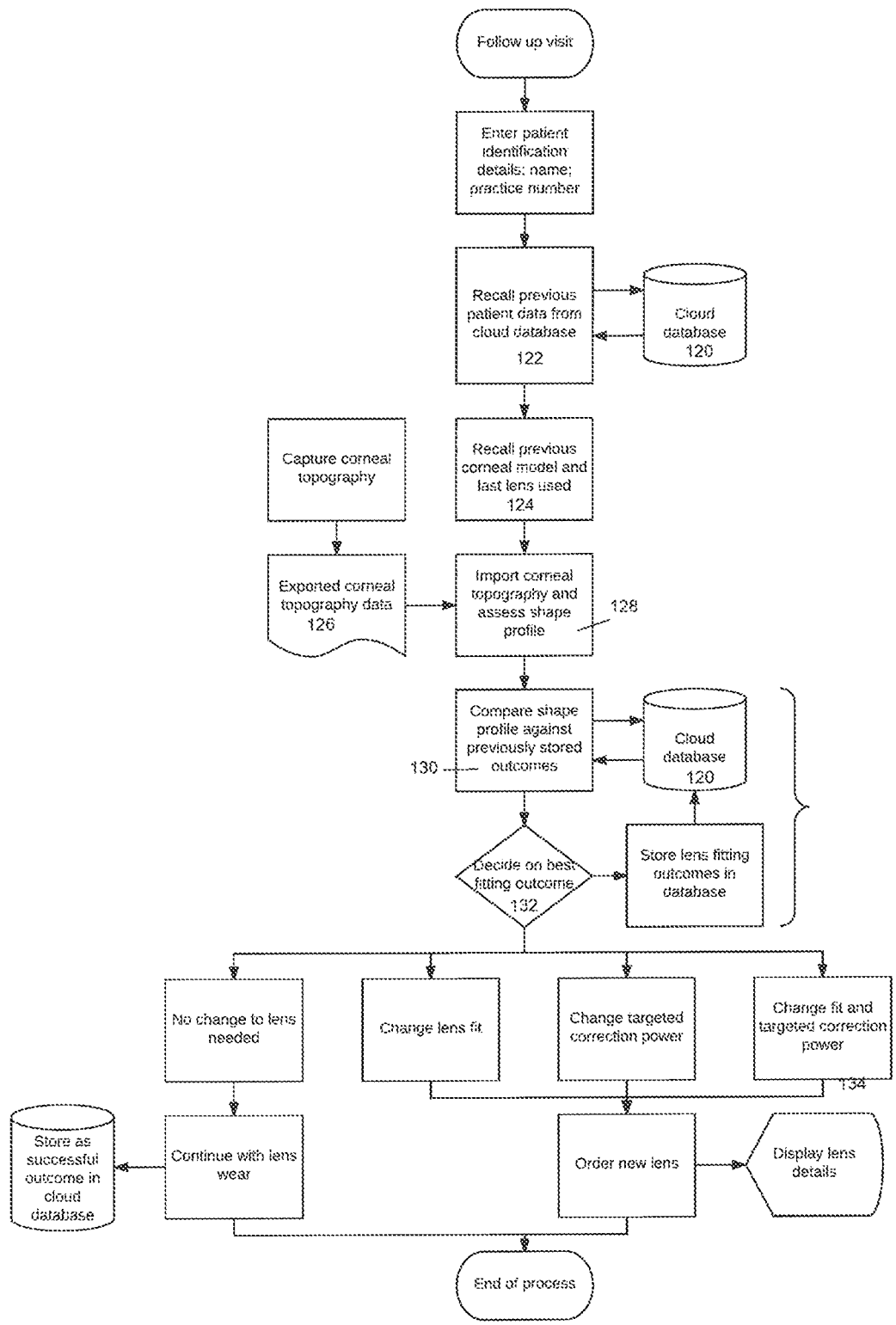
FIG. 12 is a flow chart showing a computer implemented procedure for assessing the progress of an orthokeratological treatment of a patient.

FIG. 12 is a flow chart showing the process of assessing whether a change of contact lens is required.

The software retrieves the previous patient's data 122 and previous cornea model and lens data 124 from the database.

The current corneal topography is captured 126 and imported to the database 128. The software subtracts the post lens wear corneal topography data from the corneal topography data measured before lens wear started to calculate the corneal topography shape change that the lens has induced 130.

The contact lens practitioner has the choice of reviewing this data themselves to establish if any change is required to lens fit. In this scenario the lens fitting practitioner makes a visual assessment of lens induced change to corneal shape and classifies this against patterns of corneal topography change that are known to occur from orthokeratology lens wear. The computer algorithm then uses this classification alongside measured change to refraction to calculate whether the lens needs to be altered.

Alternatively, the computer software itself will assess the data to establish the pattern of change that has been made and then establish if the lens needs to be altered based on established and known patterns of change that have been seeded into the software's learning algorithms 134.

Figure 13:
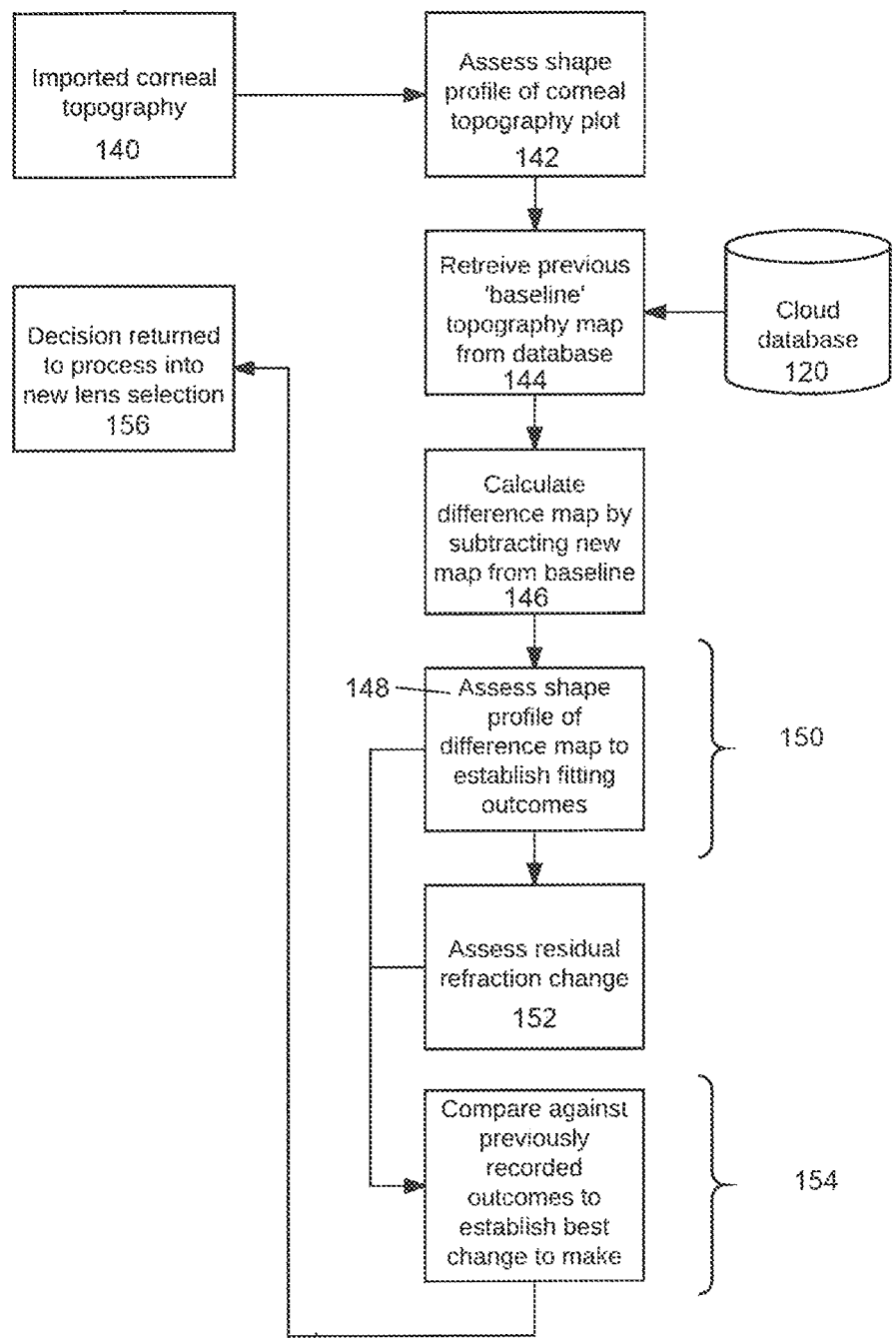
FIG. 13 is a flow chart showing a learning algorithm process.

A flow chart of an exemplary learning algorithm is shown in FIG. 13.

The software utilizes a computerized learning algorithm and cloud storage 120 to centralize data from a large number of contact lens fitters.

A patient's corneal topography is measured 140 and the corneal topography plots is assed 142. The patient's previous baseline topography is retrieved from the cloud database 120 and the differences calculated 146. The fitting outcome is assessed from the difference map 148 and is suitably displayed 150 to the lens fitter in a simple manner, such as smiley face, bullseye, frowned face and the like.

The residual refraction change is then assessed 152. The computer then compares this residual change against previously stored cases that have gone on to successful outcomes to establish the best change to make 154. The lens changes that were made are transferred to the new current case. A decision is then returned to process into a new lens selection 156.

By constantly updating the learning algorithm with corneal topography change patterns that have led to successful outcomes, the software is able to improve its ability to suggest the required change to the lens when presented with a new case.

Figure 14:
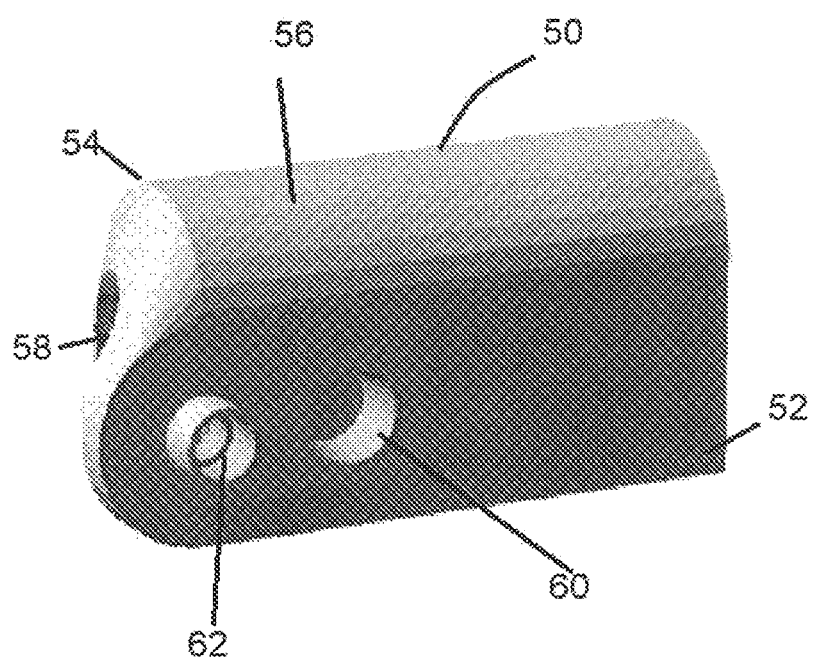
FIG. 14 is a perspective view of a mount for a corneal topography device according to a further aspect of the disclosure.
Figure 15:
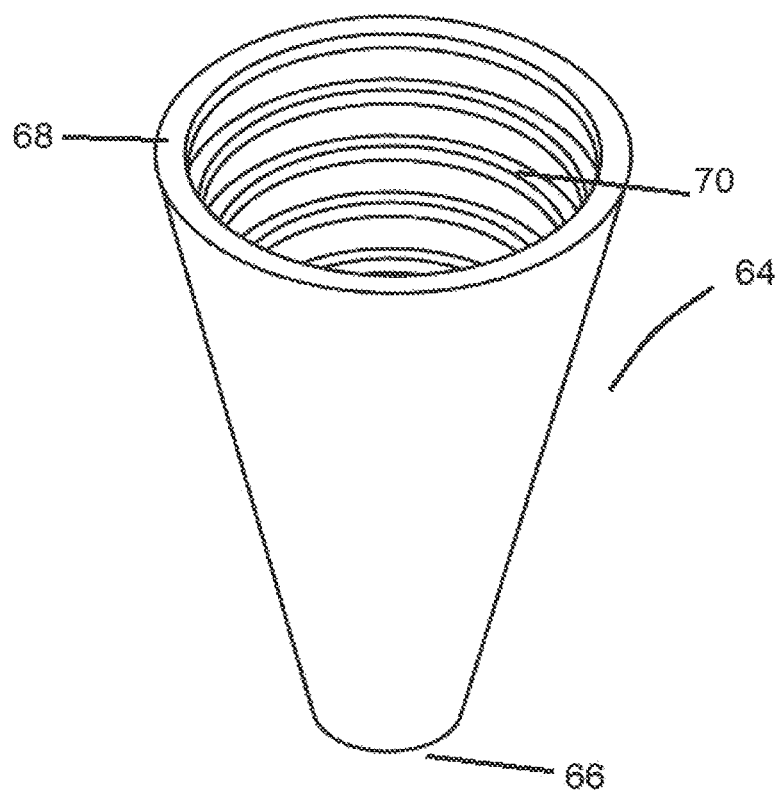
FIG. 15 is a perspective view of a second component of the corneal topography device.
Figure 16:
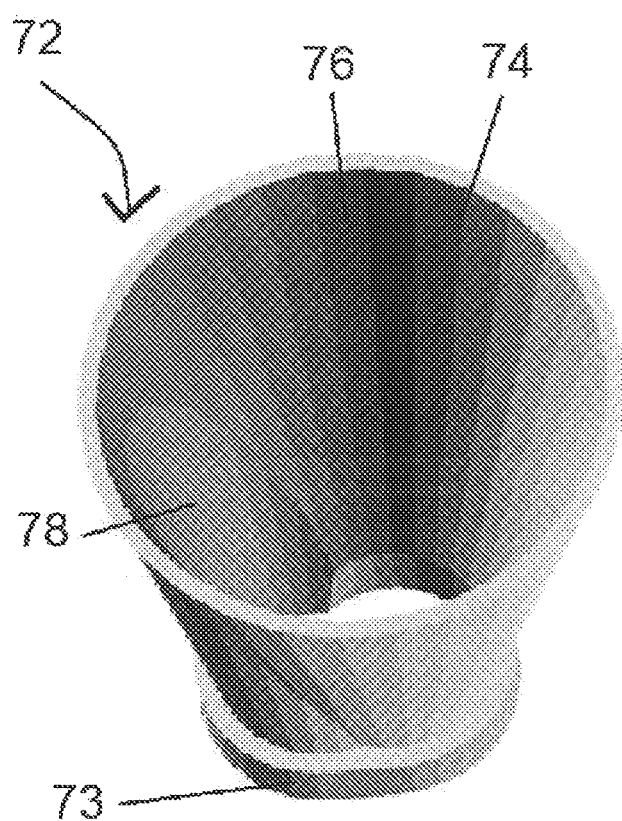
FIG. 16 is perspective view of a third component of the corneal topography device.

FIGS. 14-16 show components of a corneal topographer device that may be mounted to a portable electronic device having an inbuilt camera.

FIG. 14 shows a mount 50 that is U shaped in cross section having opposing side walls, 52, 54 a web 56 and a longitudinal slot 58. The slot 58 is dimensioned to snugly receive the edge of a portable electronic device such as a mobile phone. One side wall 52 has an aperture 60 for locating over the lens of the inbuilt camera of the portable electronic device and a mounting projection 62 for receiving and locating the other components as will be explained below.

FIG. 15 shows the second component 64 of the corneal topographer device that is frustoconical in shape having a base 66 end and an opposed upper end 68. The inner surface of the second component has spaced transparent and opaque rings 70. The base end 66 is dimensioned to snugly receive projection 62 so as to engage the second component 64 with the mount 50.

FIG. 16 shows the third component 72 of the corneal topographer device that is a housing for the second component 64 and is substantially conical in shape having an open base 73 and an opposite open upper end 74 that is dimensioned to correspond to a human eye. The housing 72 has an inner wall 76 that has a recess 78 having a curvature complimentary to the outer wall of the second component 64 so as to allow the second component 64 to be snugly received and held within the housing. The housing 72 is formed from an opaque material. When mounted, the base 73 extends over the lens aperture 60 in the mount 50.

The device is used in association with a light source for illuminating the second component so as to create a concentric illuminated ring pattern that can be projected onto an eye to be measured. The housing 72 shields the light source. The light source may be an inbuilt flash on the electronic device. In this arrangement the mount 50 includes a lens for focusing the flash.

Alternatively the mount 50 may include an inbuilt LED light(s), a small rechargeable battery, on/off switch and associated circuitry to control the LED illumination and battery charging through a USB interface. The base also contains a focussing lens calculated to ensure correct focus of the eye being image.

To use the device, specific application software for the electronic device will be installed, which once installed and running will guide the image capture process. Once the device is correctly aligned, the software will automatically capture an image of the eye that contains the focussed ring images projected by the second component 64. The software then uses image recognition techniques to assess the location of each ring and through a mathematical process reconstruct the three dimensional shape of the cornea measured using the known position of the inner cone at the time of image capture and the measured ring spacing on the captured image.

Once processed, the corneal topography data can be exported to the software described above that controls the contact lens fitting process, or utilised using contact lens fitting software installed on the phone. In this manner the corneal topography device offers a low cost solution to measuring corneal shape that extends the use of corneal topography measurement. For example it will allow any contact lens fitter that doesn't have access to a corneal topographer to be able to fit orthokeratology contact lenses. The device also allows the contact lens wearer to take corneal topography measurements that can be stored on the smart phone and transmitted to the lens fitter to assist in fitting evaluation over time.

It will of course be realized that the above has been given only by way of illustrative example of the invention and that all such modifications and variations thereto, as would be apparent to persons skilled in the art, are deemed to fall within the broad scope and ambit of the invention as is herein set forth.

The invention claimed is:

1. A contact lens comprising:
   an anterior surface;
   a posterior surface;
   a central axis;
   a central optic zone with a first radius of curvature;
   a first peripheral zone extending radially from the central optical zone, the first peripheral zone having an inner margin having a radius of curvature that is substantially identical to the first radius of curvature of the central optic zone and an outer margin, wherein the first peripheral zone is spherical at the inner margin and is aspheric at the outer margin and there is a change in asphericity across the first peripheral zone from the inner margin to the outer margin;
   a second peripheral zone that is spherical and has a steeper radius of curvature than the first radius of curvature;
   a third peripheral zone that has a steeper radius of curvature than the first radius of curvature; and
   a fourth peripheral zone has a flat surface that forms a tangent to the central axis of the contact lens.

2. The contact lens of claim 1, wherein the radius of curvature is between about 4 mm to about 12 mm, suitably between about 7 mm and about 9 mm.

3. The contact lens of claim 1, wherein the central optic zone is spherical.

4. The contact lens of claim 1, wherein the central optic zone is toric.

5. The contact lens of claim 1, wherein the first radius of curvature is described as an ellipse comprising apical curvature and eccentricity.

6. The contact lens of claim 1, wherein the asphericity at the outer margin is between about −3 to about +3, suitably between about −2 to about +2, suitably between about −1 to about +1.

7. The contact lens of claim 1, wherein the asphericity across the first peripheral zone is calculated to provide the change in sagittal height across the first peripheral zone.

8. The contact lens of claim 1, wherein the second peripheral zone has a width of between about 0.1 mm and about 2.0 mm.

9. The contact lens of claim 1 comprising a fifth peripheral zone that is spherical and has a reverse profile to the third and fourth peripheral zones.

10. The contact lens of claim 1, wherein the contact lens is an orthokeratology contact lens and the anterior surface is configured for use in a refractive manner such that the contact lens can provide active refractive correction when worn with an open eye.

11. The contact lens of claim 10, wherein the at least one further peripheral zone is non rotationally symmetric.

12. The contact lens of claim 11, wherein the central optic zone and the first peripheral zone have a vertical axis and a horizontal axis, each of the at least one further peripheral zone is divided into equal quadrants, and the vertical and horizontal axes are aligned differently to the quadrants in the at least one further peripheral zone.

13. The contact lens of claim 12, wherein the posterior surface has a peripheral or mid peripheral posterior surface that has a profile that facilitates tear exchange beneath the contact lens.

14. The contact lens of claim 13, wherein the central optic zone and the first peripheral zone have a profile that when worn by a patient moulds a cornea to provide an annulus of steepening in the cornea that surrounds a central region of the cornea such that peripheral refractive error is provided with hyperopic correction without changing refraction in the central region of the cornea.

15. A system for matching a patient with a refractive error with a stock contact lens for the patient comprising;
   a processor;
   an electronic display;
   a database containing information of parameters of a plurality of sets of stock contact lenses, wherein each contact lens in the plurality of sets of stock contact lenses is a contact lens of claim 1;
   a memory that contains instructions that are readable by the processor to control the processor to:
   (a) receive refractive error correction information for a patient;
   (b) receive corneal topography information for the patient;
   (c) calculate a cornea model of the patient from the received corneal topography information;
   (d) calculate parameters for an empirical contact lens for the patient from the received refractive error correction and calculated cornea model;
   (e) match at least one contact lens within the plurality of sets of stock lenses to the patient based upon the received refractive error correction and calculated cornea model; and
   (f) display the match on the electronic display.

16. The system of claim 15, further comprising an interface through which a user can interact with the processor to make a selection of a stock lens or an empirical lens such that if an empirical lens is selected, parameters for the empirical lens are calculated instead of matching with a stock lens.

* * * * *